Figure 1:
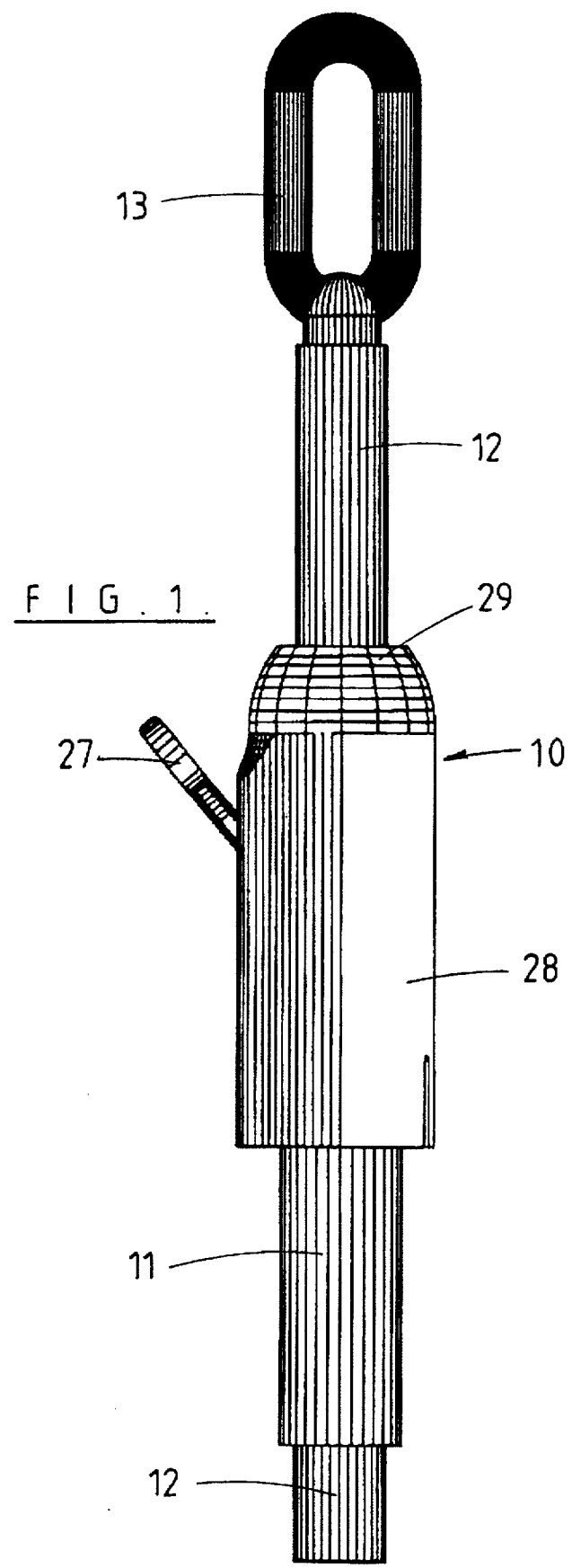

United States Patent [19]

Lynch et al.

[11] Patent Number: 5,791,805
[45] Date of Patent: Aug. 11, 1998

[54] LOCKING DEVICE FOR TELESCOPING ELEMENTS

[75] Inventors: Michael James Lynch, Whistler, Canada; Rana James Waitai, Auckland, New Zealand

[73] Assignee: Interlock Industries Limited, Wellington, New Zealand

[21] Appl. No.: 682,681

[22] PCT Filed: Jan. 20, 1995

[86] PCT No.: PCT/NZ95/00004

§ 371 Date: Nov. 13, 1996

§ 102(e) Date: Nov. 13, 1996

[87] PCT Pub. No.: WO95/20107

PCT Pub. Date: Jul. 27, 1995

[30] Foreign Application Priority Data

Jan. 21, 1994 [NZ] New Zealand .......................... 250741
Jun. 23, 1994 [NZ] New Zealand .......................... 260832

[51] Int. Cl.[6] ........................................................... F16B 7/10
[52] U.S. Cl. ........................... 403/109; 403/374; 403/377; 248/188.5; 16/115
[58] Field of Search ................................. 403/109, 110, 403/104, 373, 374, 377, 378, 379, DIG. 8, 320; 248/411, 188.5; 16/115

[56] References Cited

U.S. PATENT DOCUMENTS

| | | | |
|---|---|---|---|
| 2,817,548 | 12/1957 | Uthemann | 403/104 |
| 3,604,734 | 9/1971 | Friedman et al. | 403/104 |
| 4,029,279 | 6/1977 | Nakatani | 403/109 X |
| 4,174,900 | 11/1979 | Ina | 403/109 X |
| 4,185,936 | 1/1980 | Takahashi | 403/104 |
| 4,430,017 | 2/1984 | Stefancich | 248/411 X |
| 4,576,501 | 3/1986 | McConnell | 403/109 X |
| 4,715,089 | 12/1987 | Schema | 16/115 |
| 4,761,092 | 8/1988 | Nakatani | 403/109 X |
| 4,932,622 | 6/1990 | Hayakawa | 248/411 X |
| 5,154,449 | 10/1992 | Suei-Long | 403/109 X |
| 5,385,323 | 1/1995 | Garelick | 403/109 X |
| 5,540,017 | 7/1996 | Eilam et al. | 248/188.5 X |

FOREIGN PATENT DOCUMENTS

| | | | |
|---|---|---|---|
| 82947 | 3/1964 | France | 403/110 |
| 2632526 | 1/1978 | Germany | 403/109 |

*Primary Examiner*—Harry C. Kim
*Attorney, Agent, or Firm*—Blakely Sokoloff; Taylor & Zafman

[57] ABSTRACT

A locking device for a pair of telescoping tubular poles. An engagement member fits to one end of first pole and is slidingly engaged within second pole. A groove of the engagement member engages with a rib in the second pole so the first pole cannot rotate relative to the second pole. First pole also slidingly engages through a clamp which is mounted to the end of the second pole. A cover fits over the clamp. A cam located between the inside wall over engages with a clamping element of the clamp. A lever extends from cam through an opening in the cover. By manipulating the lever the cam can cause the clamping element to clampingly lock the first pole against sliding movement in the second pole.

17 Claims, 8 Drawing Sheets

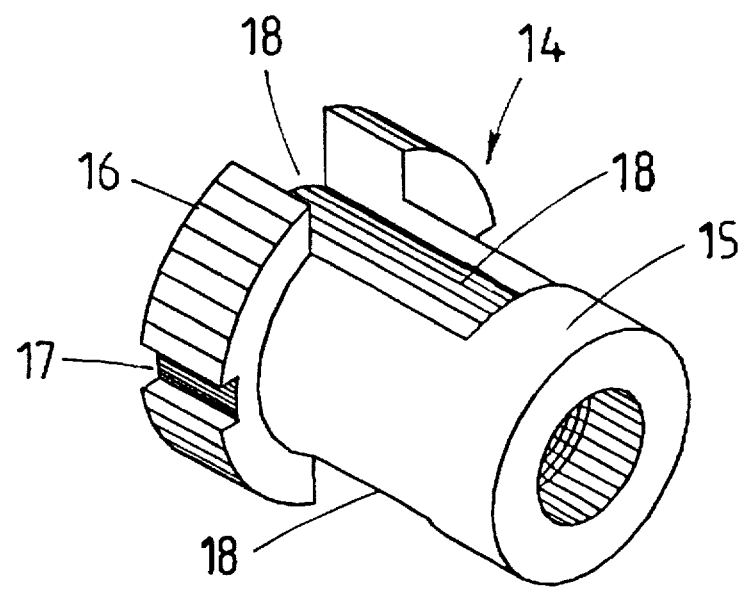
F I G . 2 .
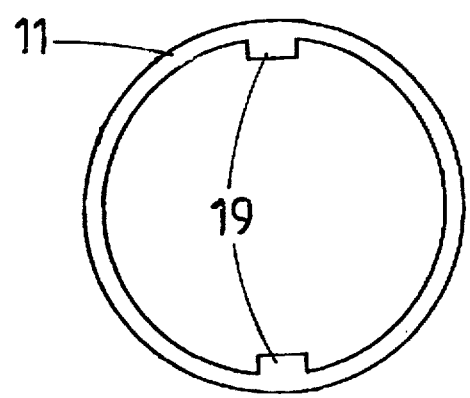
F I G . 6 .

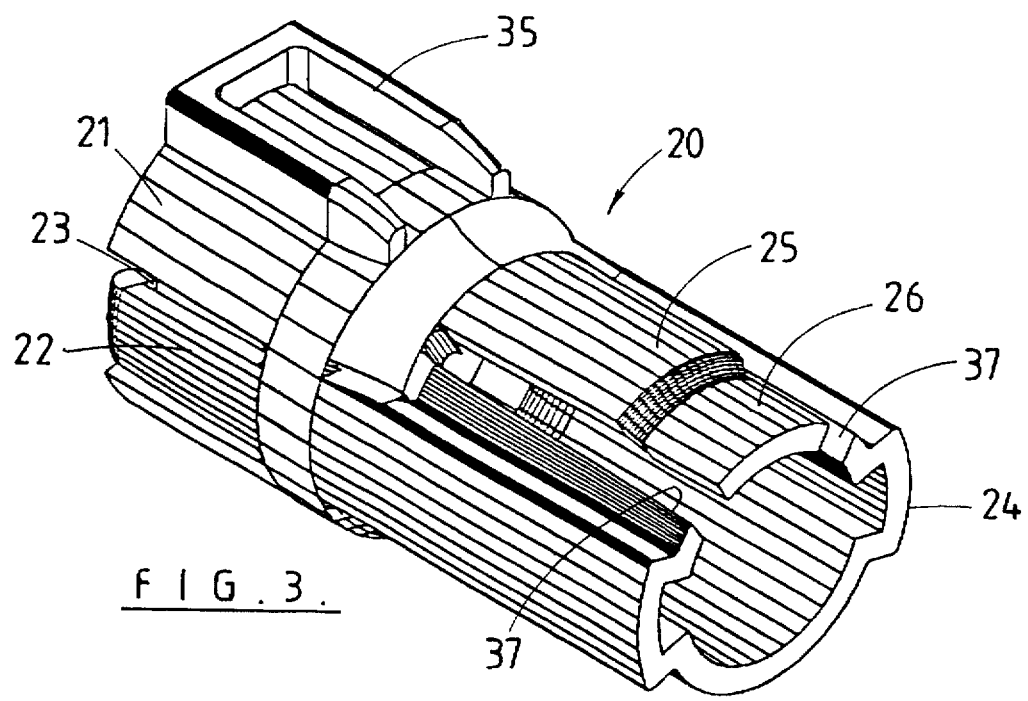
FIG. 3.
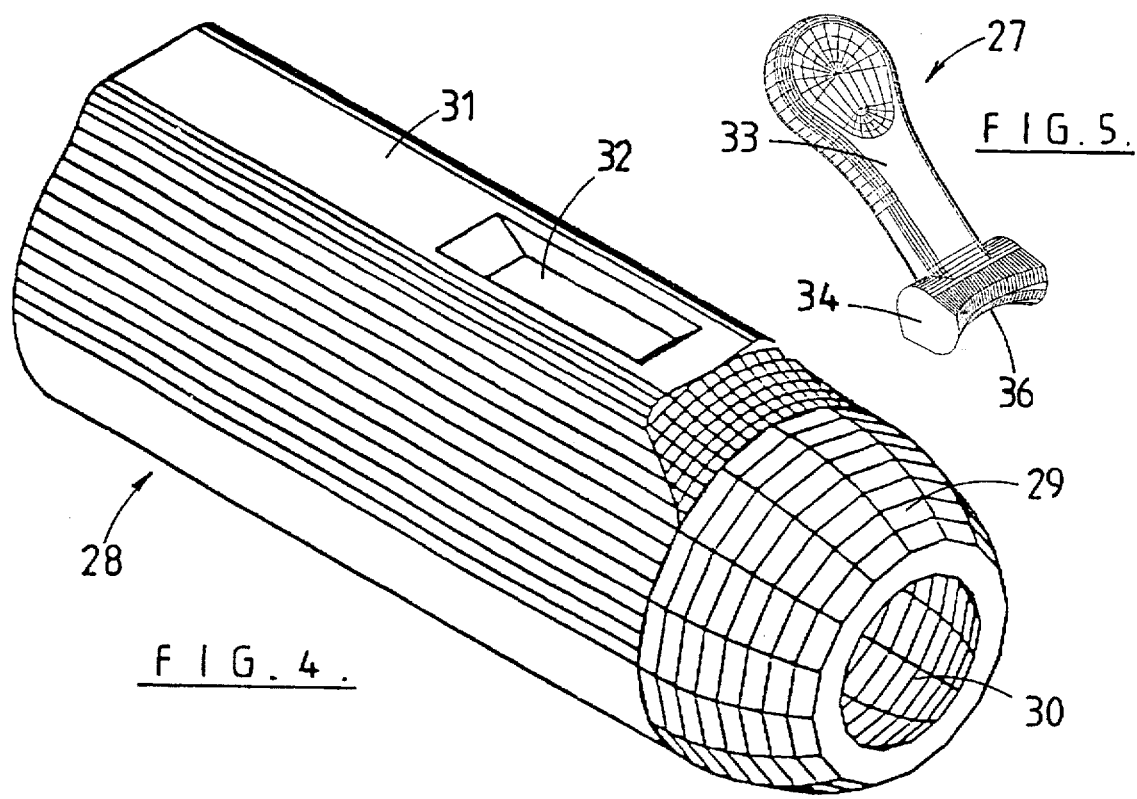
FIG. 4.
FIG. 5.

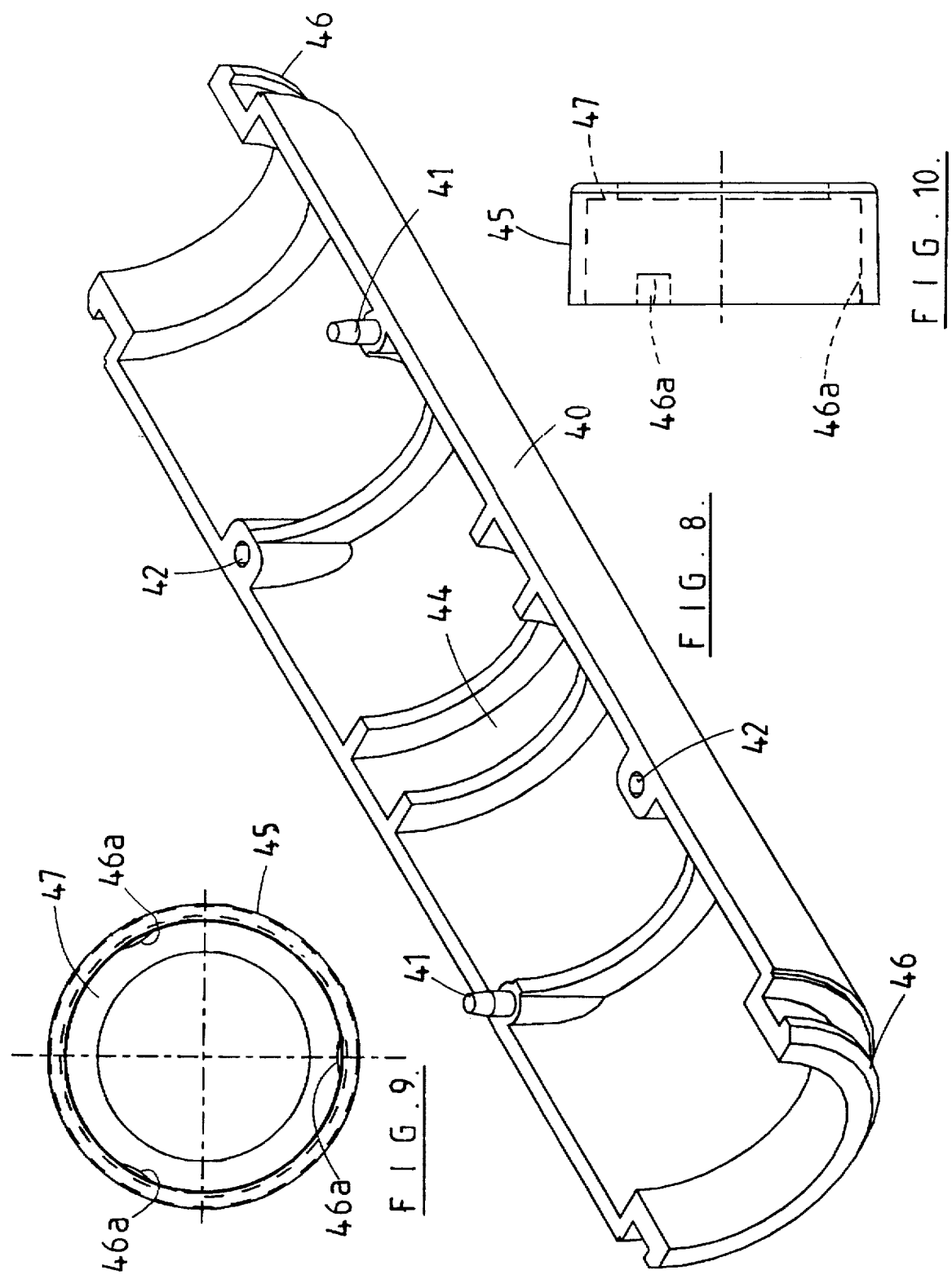

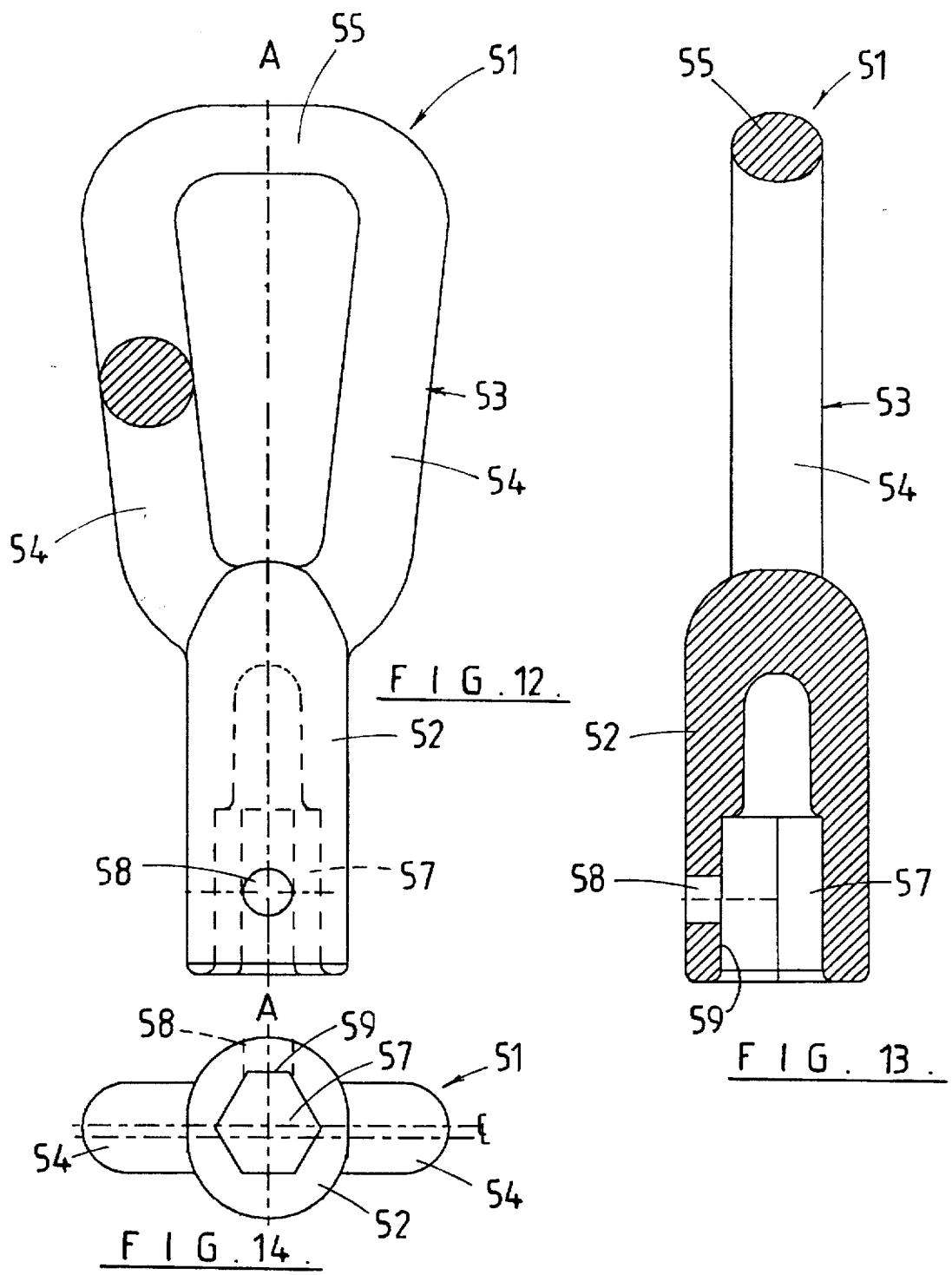

LOCKING DEVICE FOR TELESCOPING ELEMENTS

The present invention relates to a locking device for telescoping elements.

There are many uses for a telescoping assembly of two elements where the overall length of the assembly can be adjusted and then locked in such position to maintain the adjusted length. For example, it is known to provide a telescoping pole crank assembly to operate a window operator which is positioned at a remote location. Thus the outer end of one end of the assembly carries a drive link or mechanism which is adapted to drivingly engage with the window operator. The outer end of the other element is cranked so that the pole assembly can be rotated to impart a driving force to the operator. One example of such a pole crank assembly can be found in U.S. Pat. No. 4,715,089 of Truth Incorporated.

In many instances, such as with a pole assembly for a window operator, it is desirable or necessary to prevent one of the elements from rotating relative to the other. This can be achieved by having one element formed with a cross section which slidingly fits within a mating cross section of the other element, the inter-engagement of the respective cross-sections preventing relative rotation. For example, one element can have a plurality of raised ribs which engage in correspondingly shaped and disposed grooves in the other element.

In U.S. Pat. No. 4,715,089 the locking action is achieved by rotating a collar about an axis which is substantially coaxial with the longitudinal axis of the elements. Applying a rotational force to the locking collar can sometimes be difficult especially where the user cannot obtain a firm grip on the collar. Furthermore rapid release or tightening of the collar is not always possible.

A feature of the present invention is that the locking arrangement is of a type whereby manipulation of a locking collar is not required in order to carry out adjustment of the overall length of the assembly.

A further feature of the present invention is that the prevention of relative rotation between the two elements is achievable without the need to provide two specially configured elements which matingly engage.

According to one broad aspect of the invention there is provided a locking device for telescoping elements, the device comprising a lever operated clamp engaged with one of said elements and an engagement member mounted with the other of said elements, said engagement member being slidingly engaged within said one element but constrained from angular movement therein, said lever operated clamp being operable to clamp said other element against axial movement relative to said one element.

According to a second broad aspect of the invention there is provided a telescopic pole crank assembly incorporating a locking device according to the foregoing broad aspect.

Preferably the pole crank assembly includes a drive element (preferably hook shaped) at its distal end.

In the preferred form the hook shaped element is engageable in an eye of the drive means of a window operator, the surfaces of the hook element and the eye element which interengage having engagement surfaces which are of different curvature.

Figure 7:
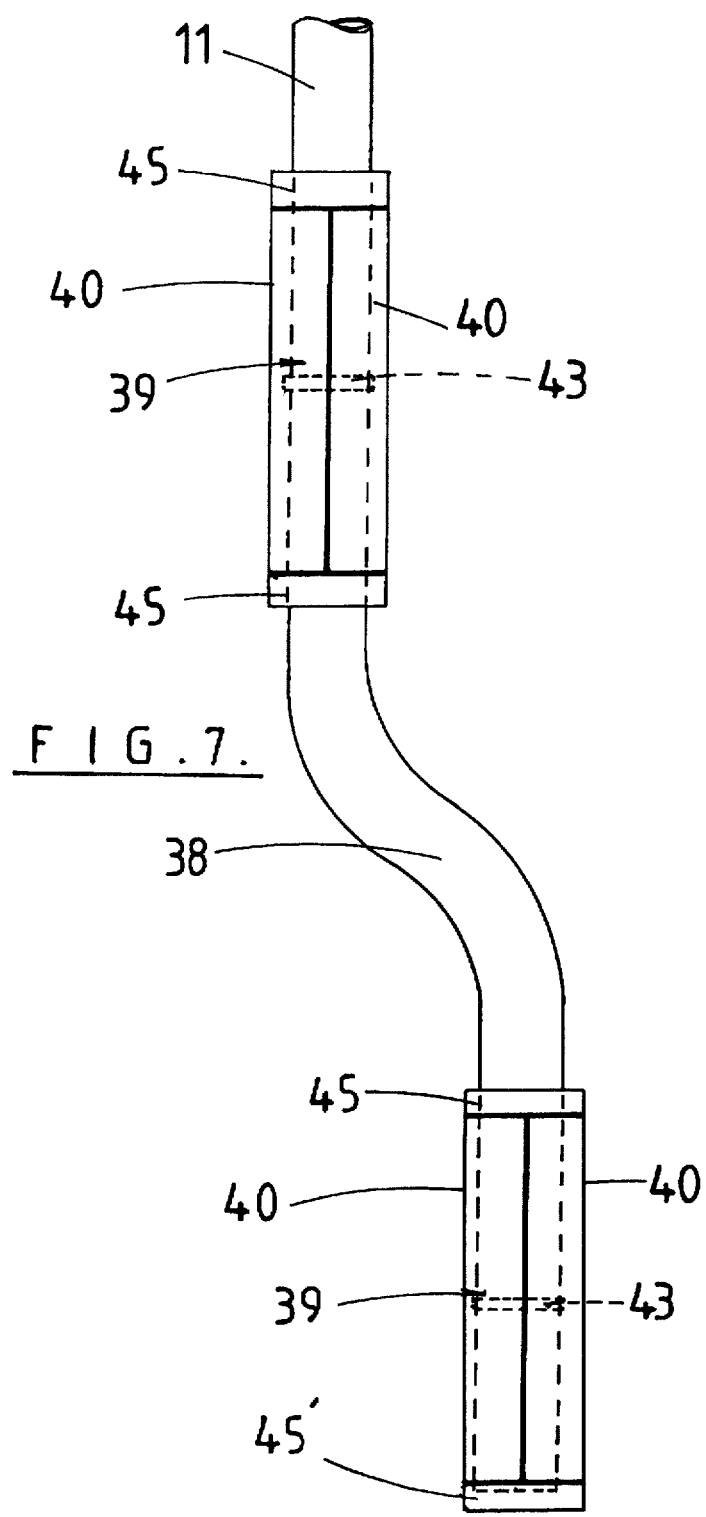
Figure 11:
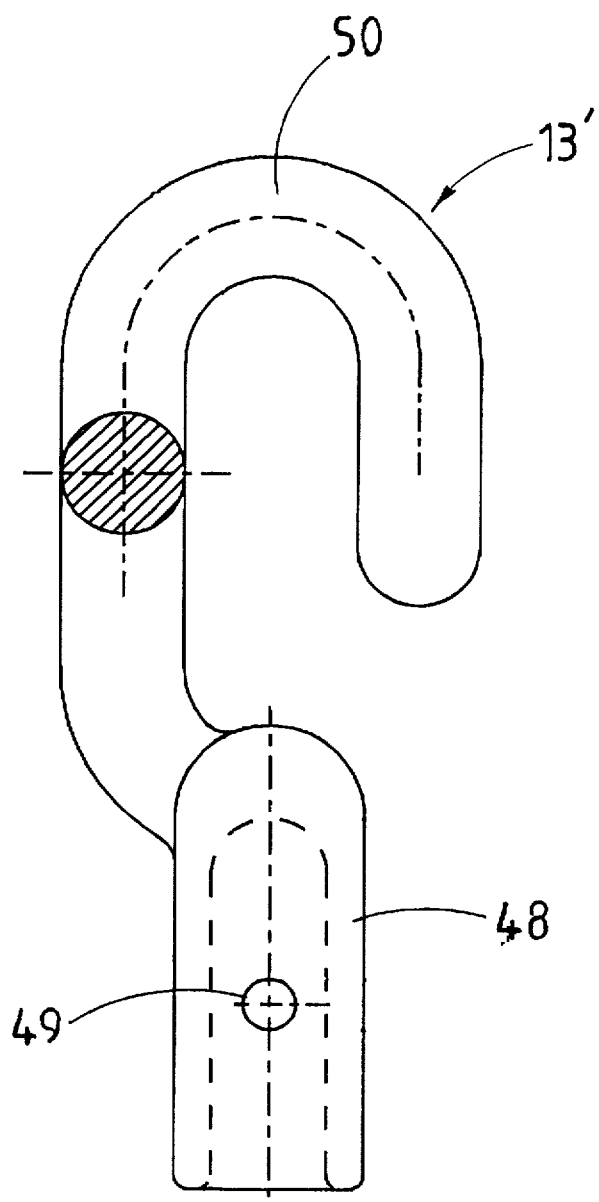
Figure 15:
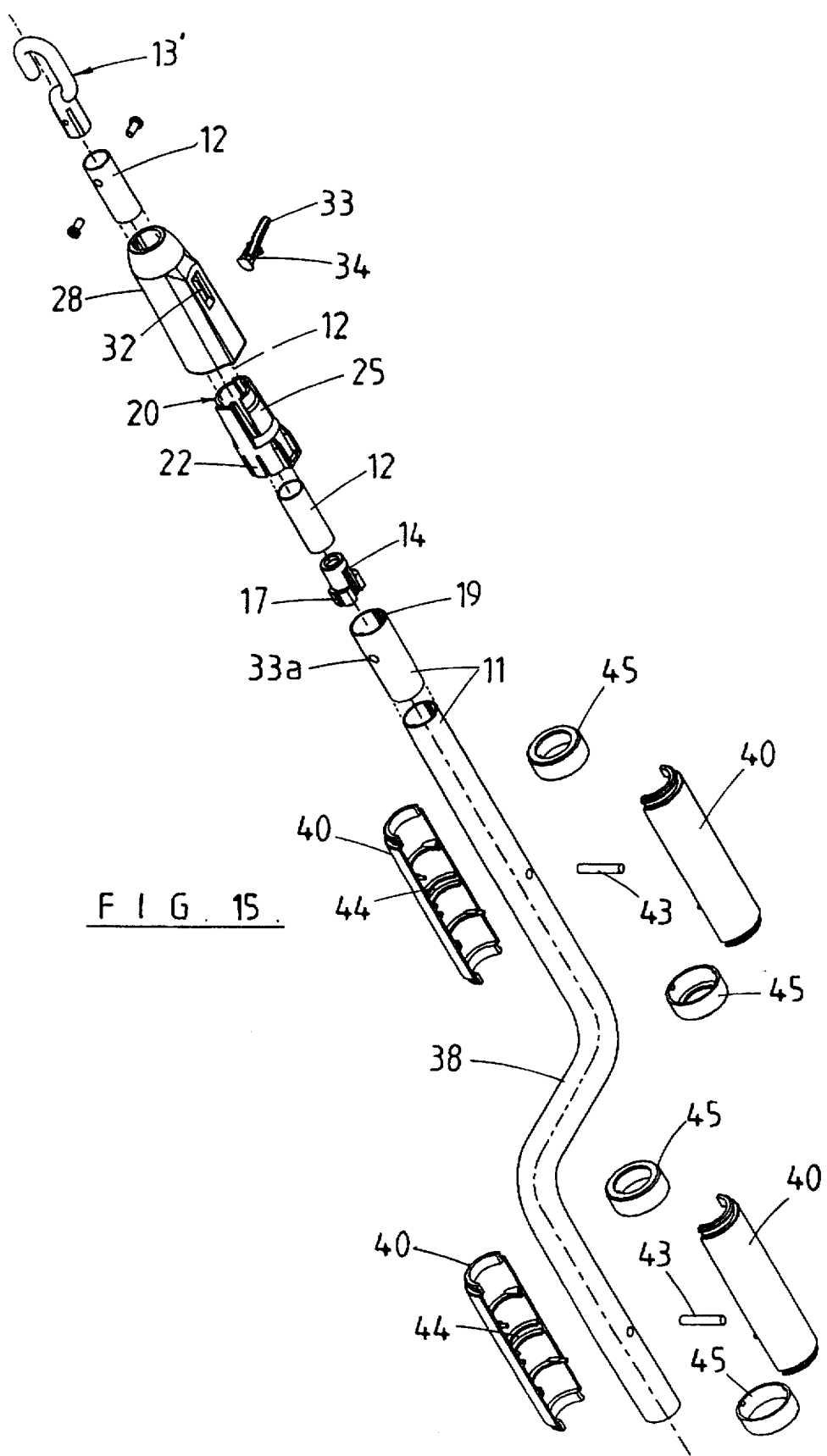

In the following more detailed description of the invention reference will be made to the accompanying drawings in which:

FIG. 1 is an elevation view of the locking device in sit on two telescoping elements, FIG. 2 is a perspective view of an engagement member which fits into the end of an internal/extension FIG. 3 is a clamp element which fits onto the end of an external/crank element, FIG. 4 is a perspective view of a cover which fits over the clamp, FIG. 5 is a perspective view of an over-centre locking cam lever, FIG. 6 is an end view of the external/crank element, FIG. 7 is an elevation view of the end of the external/crank element which is opposite that shown in FIG. 1, FIG. 8 is a perspective view of one of the handle grip components which forms the handle grips shown in FIG. 7, FIG. 9 is an end elevation of a cap which forms part of the handle grip, FIG. 10 is a side elevation of the cap of FIG. 9, FIG. 11 is an elevation view of a further form of the fitting which engages in the outer end of the internal/extension pole element, FIG. 12 is a perspective view of a fitting for mounting with the drive shaft of a window operator, FIG. 13 is a cross-section taken on line A—A of FIG. 12, FIG. 14 is an end elevation of the fitting shown in FIG. 12, and FIG. 15 is an exploded view of the overall telescopic pole crank assembly.

As illustrated in FIG. 1 the locking device 10 couples an external/crank pole element 11 (only part of the length being shown) to an internal/extension pole element 12. A fitting or drive element 13 is provided at the outer or extreme end of element 12 so as to provide for driving engagement with, say, a window operator. The other end of the external/crank element (see FIG. 7) is formed as or with a crank 38 so that a rotational force can be applied to the overall assembly.

Two handle grips 39 are provided, one at the end of crank 38 and the other adjacent where crank 38 merges into the straight length of external element 11. Each handle grip 39 is, according to a preferred form of the invention, formed from two grip components 40 (see FIG. 8) which are coupled around the periphery of external element 11 by the pins 41 of each component 40 engaging in the opposing openings 42 in the other component 40.

The handle grips 39 are located against axial movement relative to the external element 11 by a pin 43 which fits diametrically through element 11 to engage in groove 44 on the inner surface of components 40. The handle grips 39 can, however, rotate on the external element 11.

To maintain the components 40 coupled together a cap 45 (see FIGS. 9 and 10) is fitted onto each end of the handle grip 39. Cap 45 has a plurality of dimples or lugs 46 on its inner periphery and these are forced over the ridge 46 of the components 40 to thereby snap-lock in place and hold components 40 together. An annular end wall 47 of cap 45 has an internal diameter just slightly greater than that of external element 11 so that the cap can be slipped onto element 11 to engage with the handle grip components 40. The cap 45 at the end of crank 38, however, has a full wall 47.

The spider 14 shown in FIG. 2 comprises a body 15 which is provided with a flange 16 at one end thereof. A pair of diametrically opposed grooves 17 are formed in flange 16. Longitudinally extending grooves 18 are formed in body 15 and through flange 16.

The internal/extension pole element 12 is simply a length of circular cross section tubing into one end of which the body portion 15 of spider 14 is inserted. To maintain the spider 14 in place, both axially and angularly, portions of the side wall of element 12 are lanced or deformed into the longitudinal grooves 18.

The external element 11 is also of tubular construction of circular cross section but as illustrated in FIG. 6 includes a pair of diametrically opposed internal ribs 19. Spider 14 slidingly engages within external element 11 such that ribs 19 slidingly locate with grooves 17. Thus rotation of spider 14 relative to external element 11 is prevented and due to the fixing of the spider 14 to internal element 12 relative rotation between elements 11 and 12 is prevented.

A clamp 20 is fitted on that end of external element 11 through which spider 14 is engaged during assembly of the elements 11 and 12 together. As with spider 14 and cover 28 (hereinafter described) clamp 20 is preferably moulded from a suitable plastics material.

Clamp 20 incorporates an end 21 which fits over the end of external element 11. The clamp is maintained in such position by a snap-lock arrangement which is conveniently provided by a pair of fingers 22 (only one being visible in FIG. 3). Each finger has at its outer or free end a projection 23 which engages into a slot, aperture or opening 23a (see FIG. 15) in the wall of crank element 11.

The other end 24 of clamp 20 which, when the clamp is on the crank element 11 is the outermost end, also incorporates a finger 25. This finger 25 has a stepped end 26 on which cam lever 27 acts. Thus as hereinafter described a downward force on finger 25 in the vicinity of stepped portion 26 forces surface 25a of the finger 25 against the outer surface of extension element 12 thereby clamping the element 12 against longitudinal movement relative to the clamp 20.

A cover 28 fits over clamp 20. This is generally of a tubular construction which tapers to a nose 29 having an opening 30. This opening 30. is of a diameter just slightly greater than the external diameter of extension element 12.

Cover 28 has a longitudinal ridge 31 in which is located an elongate opening 32. This opening 32 accommodates lever 27.

To assemble the locking device the cam portion 34 is inserted through slot 32 from outside the cover such that the handle 33 projects from the cover 28 with the cam portion 34 located within the cover. The extension element 12 with spider 14 is inserted into element 11 prior to the clamp 20 being in place on the crank element 11 such that spider 14 becomes slidingly located in crank element 11. The cover is then slid along extension element 12 so that it extends over the clamp and snap-fits over end 21 of the clamp.

A substantially U-shaped wall 35 formed on clamp 20 engages internally within ridge 31 of cover 28 thereby angularly locating the cover on the clamp. The cover 28 includes a finger which has a hole (not shown) which snap locks over a projection on the bottom surface of clamp 20.

With the cover in position cam portion 34 engages on stepped portion 26. Cam portion 34 is scalloped (as shown by reference numeral 36) so as to conform with the curved profile of the upper surface of the stepped portion 26 and locate between but not engage the longitudinal sides 37 of the slot adjacent finger 25. The cam portion 34 is thus located in position.

The profile of cam 34 is such that with the handle 33 moved to one position in opening 32 no downward force is applied to finger 25. However, with the handle moved to another position in opening 32, the cam surface applies a downward force to stepped portion 26 thereby forcing surface 25a of finger 25 into clamping engagement with extension element 12.

It will be appreciated that in the assembling of the locking device spider 14 is engaged within crank element 11 so that the ribs 19 thereof slidingly engage within groove 17 of the spider.

Thus according to the locking arrangement of the present invention only the crank element needs to be manufactured according to a specific configuration as the extension element 12 is of simple tubular construction. Furthermore locking and unlocking of the device relies simply on cam lever 27 being manipulated so that the handle 33 is moved about a pivot axis defined by cam element 34 from one end of opening 32 to the other end. Thus locking and unlocking is not reliant on a twisting action being applied to a locking collar. As a consequence the user can obtain a positive grip of handle 33 in order to carry out the unlocking/locking operation.

The fitting 13' as shown in FIG. 11 has a mounting part 48 which engages in the open end of extension element 12. A grub screw, pin or the like passes through an opening in the wall of element 12 to engage in aperture 49 of mounting part 48 to fasten same in place. Extending from mounting part 48 is a hook 50 which in the illustrated form is of circular cross-section.

Fitting 13' engages with a fitting mounted with the drive shaft of a window operator. Such a fitting can be the eye 51 of FIGS. 12 to 14.

Eye 51 has a mounting part 52 from which extends a loop 53. Preferably the loop 53 widens outwardly from mounting part 52 as shown in FIG. 12. While the upwardly extending parts 54 are of a substantially circular cross-section the cross piece 55 is preferably non-circular (see FIG. 13) or at least of different curvature to that of hook 50.

Opening in from the base of mounting part 52 is a substantially hexagonal cross-section bore 57. However, bore 57 is asymmetric such that two sides of the hexagonal shape are longer than the others. An opening 58 is drilled and tapped through the wall of mounting part 52 into side 59 located between the aforementioned longer sides. Accordingly any burring caused by the drilling and/or taping of opening 59 will not hinder a regular hexagonal shaped drive shaft of a window operator from being inserted into bore 57 as the burring will be accommodated in the clearance formed by side 59 being spaced from the surface of the drive shaft.

A grub screw (not shown) engaged in opening 58 fixes the eye 51 to the drive shaft.

In use hook fitting 13' is located within eye 51 whereupon rotation of the pole will impart rotation to eye 51 hence the drive shaft of the window operator. Because of the different curvatures of the hook 50 and cross piece 55 of eye 51 and the widening of loop 53 away from the mounting part 52 any tendency for hook 50 to climb over the surface of eye 51 (especially at certain angles of attack) and hence separate from the eye is avoided. Preferably the radius of curvature of the upwardly extending parts 54 of eye 51 are also different to that of hook 50 in order to further avoid hook climbing out of engagement with eye 51.

The present invention thus provides not only a locking device for telescoping elements but also a telescoping pole crank which facilitates operation of a window operator at a remote location. The hook and eye as disclosed herein provides a positive coupling between the pole and the drive of the operator.

We claim:

1. A telescopic assembly comprising a first elongate element slidingly engaged with a second elongate element and a locking device, the locking device comprising a clamp engaged with said first element and an engagement member fixedly mounted with said second element, said engagement member being slidingly engaged within said first element, the engagement member having at least one elongate openended recess slidingly engaged with an internal longitudinally extended rib of the first element wherein the engagement member is constrained from angular movement in the said first element, said clamp being operable to clamp said second element against axial movement relative to said first element, said clamp being mounted with said first element and said second element is slidingly engaged within said clamp, said clamp including a clamping element which under action of a clamp actuator clampingly engages with said second element to prevent sliding movement thereof within said clamp, the clamp actuator including a cam coupled to a lever, said cam being engaged between a surface of a cover located with said clamp and said clamping element, the lever projecting through an opening in said cover.

2. The assembly as claimed in claim 1 wherein the clamping element is a cantilever mounted projection having an engagement surface with which said cam is engaged.

3. The assembly as claimed in claim 2 wherein the engagement surface has a curved profile which engages with a curved portion of said cam, said clamping element further including a clamping surface which engages with an external wall surface of said second element.

4. The assembly as claimed in claim 1 wherein the engagement member, the clamp, the clamp actuator and the cover are all constructed from a plastics material.

5. A telescopic pole crank assembly comprising a first elongate element slidingly engaged with a second elongate element and a locking device comprising a clamp engaged with said first element, said second element being slidingly engaged within said clamp, said clamp including a clamping element which under action of a clamp actuator clampingly engages with said second element to prevent sliding movement thereof within said clamp, said second element being constrained against angular movement relative to the first element, the clamp actuator including a cam coupled to a lever, said cam being engaged between a surface of a cover located with said clamp and said clamping element, the lever projecting through an opening in said cover and a drive element in the form of a hook located at a distal end of said second element.

6. The telescopic pole crank assembly as claimed in claim 5 wherein the first and second elements are of tubular construction with an external diameter of said second element being slightly less than an internal diameter of said first element.

7. The telescopic pole crank assembly as claimed in claim 5 wherein the distal end of said first element is formed as a crank such that a rotational force can be applied to the first and second elements.

8. The telescopic pole crank assembly as claimed in claim 7 wherein two handle grips are provided, one at the end of the crank and the other adjacent where crank merges into a length of said first element.

9. The telescopic pole crank assembly as claimed in claim 8 wherein each handle grip is formed by a pair of grip components coupled about a periphery of said first element, said components being coupled together by an end cap fitted onto each end of the handle grip.

10. The telescopic pole crank assembly as claimed in claim 9 wherein each grip component includes a groove into which engages at least one pin located diametrically through said first element such that the handle grip can rotate on said first element but not move axially therealong.

11. The telescopic pole crank assembly as claimed in claim 5 in combination with a drive means for a window operator, said drive means including an eye formed by a pair of legs which divergingly extend from a mounting part, distal ends of the legs being coupled by a cross piece.

12. The combination as claimed in claim 11 wherein the legs are of substantially circular cross-section and the cross piece is substantially of elliptical cross section, said cross piece presenting a curved engagement surface which is of different curvature to that of the drive element hook.

13. The telescopic pole crank assembly as claimed in claim 5 wherein a mounting part includes an asymmetric hexagonal cross-section bore such that two opposing sides of the hexagonal cross-section bore are longer than other sides, the mounting part having an opening extending through a wall of the mounting part into that side of the bore located between said longer sides.

14. A telescopic assembly comprising a first circular cross-section tubular element slidingly engaged with a second circular cross-section tubular element, an engagement element fixedly mounted to an end of the second element and slidingly engaged within said first element, means to prevent angular movement of the engagement element in said first element, a clamp mounted with an end of the first element from which the end of the second element opposite to that having the engagement element projects, said second element being slidingly engaged within said clamp, a cover engaged with the clamp, a cam means located between a part of the cover and a clamping element of the clamp, and a lever coupled with the cam means, said lever projecting from said cover to be operable externally of the cover, the clamping element being movable by the cam means when moved by the lever between a first position where the clamping element clamps said second element against sliding movement and a second position where the second element is free to slide relative to the first element.

15. The telescopic assembly as claimed in claim 14 wherein the clamping element is a cantilever mounted projection having an engagement surface with which said cam means is engaged.

16. The telescopic assembly as claimed in claim 14 wherein a drive element is located at the distal end of the second element and the distal end of the first element is formed as a crank, there being two handle grips one at the end of the crank and the other adjacent where the crank merges into the length of the first element.

17. A telescopic assembly as claimed in claim 16 wherein the first element has an internal longitudinally extending rib and the engagement element has a groove through which the rib is engaged.

* * * * *

UNITED STATES PATENT AND TRADEMARK OFFICE
CERTIFICATE OF CORRECTION

PATENT NO. : 5,791,805
DATED : August 11, 1998
INVENTOR(S) : Lynch et al.

It is certified that error appears in the above-identified patent and that said Letters Patent is hereby corrected as shown below:

In column 1, at line 66 please delete "in sit" and insert --in situ--.

In column 2, at line 2, please insert --element,-- after "internal/extension".

Signed and Sealed this

Twenty-second Day of June, 1999

*Attest:*

Q. TODD DICKINSON

*Attesting Officer*   Acting Commissioner of Patents and Trademarks